United States Patent [19]
Tullar et al.

[15] 3,682,991
[45] Aug. 8, 1972

[54] 3,3,5-TRIMETHYLCYCLOHEXYL-ALKYL-CARBOXYLIC ACIDS

[72] Inventors: Benjamin F. Tullar, Chatham; Roman R. Lorenz, East Greenbush, both of N.Y.

[73] Assignee: Sterling Drug Inc., New York, N.Y.

[22] Filed: Oct. 19, 1970

[21] Appl. No.: 82,149

Related U.S. Application Data

[62] Division of Ser. No. 724,617, April 26, 1968, Pat. No. 3,578,686.

[52] U.S. Cl. .............. 260/413, 260/514 R, 424/331
[51] Int. Cl. ............................................. C08h 17/36
[58] Field of Search .................... 260/413, 514 R

[56] References Cited

UNITED STATES PATENTS

| | | | |
|---|---|---|---|
| 1,693,801 | 12/1928 | Adams et al. | 260/413 |
| 2,560,242 | 7/1951 | Pelton et al. | 260/514 |
| 3,578,686 | 5/1971 | Tullar et al. | 260/413 X |

OTHER PUBLICATIONS

Friedrich, J., Chem. Abstract, Vol. 67, 1967, 12804m

*Primary Examiner*—Lewis Gotts
*Assistant Examiner*—Ethel G. Love
*Attorney*—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT

2-Hydroxy-3-[(3,3,5-trimethylcyclohexyl)-$(CH_2)_n$]-1,4-naphthoquinones where $n$ is an integer from 4 to 12 inclusive, having antimalarial properties, are prepared: (a) by heating 2-hydroxy-1,4-naphthoquinone with a diacyl peroxide of the formula [(3,3,5-trimethylcyclohexyl)-$(CH_2)_n$—CO]$_2$O$_2$ where $n$ is 4 to 12 inclusive to produce said naphthoquinones where $n$ is 4 to 12, respectively: (b) by oxidizing under alkaline conditions 2-hydroxy-3-[(3,3,5-trimethylcyclohexyl)-$(CH_2)_n$]-1,4-naphthoquinone where $n$ is 5 to 12 inclusive to produce the corresponding compound where $n$ is 4 to 11, respectively; and, (c) by the steps of oxidizing 2-[(3,3,5-trimethylcyclohexyl)-$(CH_2)_n$]-1-naphthol where n is 4 to 12 inclusive to form 2-[(3,3,5-trimethylcyclohexyl)-$(CH_2)_n$]-1,4-naphthoquinone, reacting the latter with a peroxide under alkaline conditions to form 2-[(3,3,5-trimethylcyclohexyl)-$(CH_2)_n$]-1,4-naphthoquinone-2,3-oxide and hydrolyzing the 2,3-oxide under acidic conditions to yield 2-hydroxy-3-[(3,3,5-trimethylcyclohexyl)-$(CH_2)_n$]-1,4-naphthoquinone. Novel intermediates include compounds of the formula (3,3,5-trimethylcyclohexyl)-$(CH_2)_x$—COOH where $x$ is an integer from 3 to 12 inclusive.

11 Claims, No Drawings

3,3,5-TRIMETHYLCYCLOHEXYL-ALKYL-CARBOXYLIC ACIDS

This application is a division of copending application Ser. No. 724,617, filed Apr. 26, 1968, now U.S. Pat. No. 3,578,686.

This invention relates to compositions of matter known in the art of chemistry as 3-substituted-2-hydroxy-1,4-naphthoquinones, to intermediates thereof and to their preparation.

The invention sought to be patented, in one composition aspect, resides in the class of compounds which we designate 2-hydroxy-3-[(3,3,5-trimethylcyclohexyl)-$(CH_2)_n$]-1,4-naphthoquinones where $n$ is an integer from 4 to 12 inclusive. Accordingly, we depict the compounds as having (3,3,5-trimethylcyclohexyl)-$(CH_2)_n$ attached to the 3-position of 2-hydroxy-1,4-naphthoquinone. The embodiments of this composition aspect of the invention possess the applied use characteristics of exerting an antimalarial effect in mammals, as determined by standard evaluation procedures using plasmo-dial infections of rodents.

Without limiting the generality of the foregoing, illustrative and preferred embodiments of the 2-hydroxy-3-[(3,3,5-trimethylcyclohexyl)-$(CH_2)_n$]-1,4-napthoquinones are those of the Formula I:

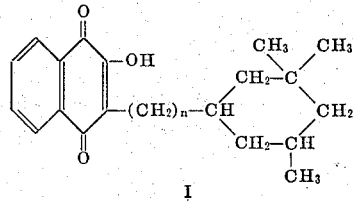

where $n$ is an integer from 4 to 12 inclusive.

The invention sought to be patented, in another composition aspect resides in compounds which we designate (3,3,5-trimethylcyclohexyl)-$(CH_2)_x$—COOH where $x$ is an integer from 3 to 12 inclusive. The embodiments of this composition aspect of the invention are useful for the preparation of the foregoing 2-hydroxy-3-[(3,3,5-trimethylcyclohexyl-$(CH_2)_n$]-1,4-naphthoquinones.

The invention sought to be patented, in a process aspect, resides in the process of heating 2-hydroxy-1,4-naphthoquinone with the diacyl peroxide of the formula [(3,3,5-trimethylcyclohexyl)-$(CH_2)_n$—$CO]_2O_2$ where $n$ is 4 to 12 inclusive to produce the compound of Formula I where n is 4 to 12, respectively. Another process aspect of the invention sought to be patented comprises oxidizing under alkaline conditions the compound of the Formula I where 5 to 12 inclusive to produce the corresponding compound where n is 4 to 11, respectively. This oxidation is carried out preferably by successively oxidizing said compound first with hydrogen peroxide and then with a cupric salt.

The invention sought to be patented, in another process aspect resides in the process which comprises the steps of oxidizing 2-[(3,3,5-trimethylcyclohexyl)-$(CH_2)_n$b-1-naphthol where n is 4 to 12 inclusive to form 2-[(3,3,5-trimethylcyclohexyl)-$(CH_2)_n$]-1,4-naphthoquinone, reacting the latter with a peroxide under alkaline conditions to form 2-[(3,3,5-trimethylcyclohexyl)-$(CH_2)_n$]-1,4-naphthoquinone-2,3-oxide, and hydrolyzing the 2,3-oxide under acidic conditions to yield 2-hydroxy-3-[(3,3,5-trimethylcyclohexyl)-$(CH_2)_n$]-1,4-naphthoquinone. Optionally, the above oxidizing step can be carried out stepwise as follows: reacting 2-[(3,3,5-tri-methylcyclohexyl)-$(CH_2)_n$]-1-naphthol with a diazotized salt of sulfanilic acid to form 2-[(3,3,5-trimethylcyclohexyl)-$(CH_2)_n$]-4-(4-sulfophenyldiazo)-1-naphthol, reducing the diazo compound to form 4-amino-2-[(3,3,5-trimethylcyclohexyl)-$(CH_2)_n$]-1-naphthol, oxidizing said 4-amino compound to form 2-[(3,3,5-trimethylcyclohexyl)-$(CH_2)_n$]-1,4-dihydro-4-imino-1-oxonaphthalene, and hydrolyzing said 4-imino compound under acidic conditions to form a 2-[(3,3,5-trimethylcyclohexyl)-$(CH_2)_n$]-1,4-naphthoquinone.

The manner and process of making and using the invention will now be generally described so as to enable a person skilled in the art of medicinal chemistry to make and use the same, as follows:

Preparation of Intermediates—The preparation of intermediate acids of the formula 3,3,5-trimethylcyclohexyl-$(CH_2)_x$—COOH where $x$ is 3 to 12 inclusive and other intermediates are carried out by generally known methods as follows: 2-[α-(3,3,5-trimethylcyclohexyl)acetyl]cyclohexanone is prepared by reacting α-(trimethylcyclohexyl)acetyl chloride with 1-morpholinocyclohexene by mixing said reactants in the presence of an acid-acceptor, e.g., triethylamine, preferably in a suitable inert solvent, e.g., chloroform, dioxane, benzene, while maintaining the temperature of the reaction mixture preferably between about 25°–40C. and then heating the reaction mixture containing 1-morpholino-2-[α-(3,3,5-trimethylcyclohexyl)acetyl]-cyclohexene with an aqueous solution containing a mineral acid, e.g., hydrochloric acid, to produce the 2-[α-(3,3,5-trimethylcyclohexyl)acetyl] cyclohexanone. Conversion of the later to 7-keto-8-(3,3,5-trimethylcyclohexyl)octanoic acid is effected by heating the cyclohexanone in an aqueous alkaline medium, e.g., aqueous potassium or sodium hydroxide solution. The keto acid is then reduced to the corresponding 8-(3,3,5-trimethylcyclohexyl)octanoic acid by heating it in a suitable solvent, e.g., diethylene glycol, with hydrazine hydrate at about 110°–140°C. and subsequent hydrolysis of the resulting hydrazone by heating it in the same solvent at about 160°–250°C., preferably at about 180°–225°C. Alternatively, but less preferred, this reduction can be effected using zinc amalgam and concentrated hydrochloric acid. 8-(3,3,5-Trimethylcyclohexyl)-octanoyl chloride is readily obtained by heating a solution of 8-(3,3,5-trimethylcyclohexyl)octanoic acid in a suitable solvent, e.g., chloroform, with thionyl chloride. The acid chloride is then converted to bis[8-(3,3,5-trimethylcyclohexyl)-octanoyl] peroxide by treatment of its ether solution at about −5° to 0°C. with hydrogen peroxide and pyridine. 2-[8-(3,3,5-trimethylcyclohexyl)octanoyl]cyclopentanone, is prepared following the procedure described above for 2-[α-(3,3,5-trimethylcyclohexyl)acetyl]cyclohexanone but using a molar equivalent of 1-morpholinocyclopentene instead of 1-morpholinocyclohexene. 6-Keto-13-(3,3,5-trimethylcyclohexyl)tridecanoic acid was prepared by the procedure described above for 7-keto-8-(3,3,5-trimethylcyclohexyl)octanoic acid but using 2-[8-(3,3,5-trimethylcyclohexyl)octanoyl]cyclopentanone in place of 2-[α-(3,3,5-trimethylcyclohexyl)acetyl] cyclohexanone. 13-(3,3,5-trimethylcyclohexyl)tridecanoic acid, 13-(3,3,5-trimethylcyclohexyl)tridecanoyl chloride and bis[13-(3,3,5-trimethylcyclohexyl)-tridecanoyl] peroxide are prepared by the procedures described above for 8-(3,3,5-trimethylcyclohexyl)octanoic acid, 8-(3,3,5-trimethylcyclohexyl)octanoyl chloride and bis[8-(3,3,5-tri-methylcyclohexyl)octanoyl] peroxide, respectively using the appropriate starting materials. Other intermediates prepared by conventional means are illustrated below in the specific exemplary disclosure, for example: 8-(3,3,5-trimethylcyclohexyl)octanol by reducing 8-(3,3,5-trimethylcyclohexyl)-octanoic acid with lithium aluminum hydride; 8-(3,3,5-trimethylcyclohexyl)octyl bromide by reacting 8-(3,3,5-trimethylcyclohexyl)octanol with hydrobromic acid; 10-(3,3,5-trimethylcyclohexyl)decanoic acid by reacting diethyl sodiomalonate with 8-(3,3,5-trimethylcyclohexyl)octyl bromide to yield diethyl-α-(3,3,5-trimethylcyclohexyl)octyl malonate and heating the latter in an alkaline solution to produce the corresponding malonic acid which is decarboxylated to yield said 10-(3,3,5-trimethylcyclohexyl)decanoic acid. The latter compound is converted successively into 10-(3,3,5-trimethylcyclohexyl)decanoyl chloride and bis[10-(3,3,5-trimethylcyclohexyl)decanoyl] peroxide as described above for related compounds.

The preparation of the intermediate ω-(3,3,5-trimethylcyclohexyl)alkanoic acids of the formula (3,3,5-trimethylcyclohexyl)-$(CH_2)_x$—COOH where $x$ is an integer from 3 to 12 inclusive are prepared by generally known methods as shown hereinabove and in the specific examples hereinbelow.

The reaction of (3,3,5-trimethylcyclohexyl)-$(CH_2)_x$—COOH where $x$ is 3 to 11 inclusive with 1-naphthol to form 2-[(3,3,5-trimethylcyclohexyl)-$(CH_2)_x$—C(= O)]-1-naphthol is run by heating the reactants in the presence of a condensing agent, e.g., $BF_3$ or $ZnCl_2$, preferably in boron trifluoride etherate at about 95°C. Heating temperatures in the range of about 80° to 120°C. can be used. The reduction of the 2-[(3,3,5-trimethylcyclohexyl)-$(CH_2)_x$—C( = 0)]-1-naphthol where $x$ is 3 to 11 inclusive is carried out by heating it with amalgamated zinc and concentrated hydrochloric acid, preferably refluxing in a suitable solvent e.g., methanol, ethanol, acetic acid, etc., to yield 2-[(3,3,5-trimethylcyclohexyl)-$(CH_2)_n$]-1-naphthol where $n$ is 4 to 12 inclusive.

Preparation of Final Products—The 2-hydroxy-3-[(3,3,5-trimethylcyclohexyl)-$(CH_2)_n$]-1,4-naphthoquinone where $n$ is 4 to 12 inclusive is prepared by heating 2-hydroxy-1,4-naphthoquinone with the diacyl peroxide of the formula [(3,3,5-trimethylcyclohexyl)-$(CH_2)_n$—CO]$_2$O$_2$ where $n$ is 4 to 12, respectively. The reaction is carried out preferably using a solvent inert to the reaction condition, e.g., a lower-alkanoic acid, preferably acetic acid, at a temperature in the range of about 75°–150°C., preferably between about 90°–110 °C. The conversion of the 2-hydroxy-3-[(3,3,5-trimethylcyclohexyl)-$(CH_2)_n$]-1,4-naphthoquinone where $n$ is 5 to 12 inclusive to the corresponding compound where $n$ is 4 to 11, respectively, is carried out by oxidation under alkaline conditions, preferably by successive oxidations under alkaline conditions first using hydrogen peroxide and then a cupric salt, preferably a salt of a strong inorganic acid, e.g., cupric sulfate, cupric chloride, cupric nitrate. The oxidations are carried out preferably in an aqueous medium, e.g., water dioxane mixtures, using sodium carbonate, potassium carbonate, sodium hydroxide, potassium hydroxide, or the like, to provide the alkaline conditions. The oxidation with hydrogen peroxide is conducted preferably by warming the reactants under an inert atmosphere, e.g., nitrogen. The excess hydrogen peroxide is preferably removed by chilling the reaction mixture, acidifing it and passing sulfur dioxide through the chilled mixture. The mixture is again made alkaline and then the oxidation with the cupric salt is conducted, preferably by heating the reaction mixture at about 75°–125°C. with a preferred range of about 90°–110°C.; optionally, this oxidation can be run at a lower temperature, i.e., down to about room temperature, although a longer time is required for completion of the reaction. Variations in the oxidative conversions of the 2-hydroxy-3-[3,3,5-trimethylcyclohexyl-$(CH_2)_n$]-1,4-naphthoquinone where $n$ is 5 to 12 to the corresponding where $n$ is 4 to 11, respectively, can be made, for example: other water-miscible organic solvents can be used instead of dioxane, e.g., diethylformamide, tetrahydrofuran; potassium ferricyanide can be used in place of the cupric salt; the oxidation can be effected directly in one step, although with decrease in yield, by using a strong oxidizing agent, e.g., potassium permanganate, sodium dichromate, also under alkaline conditions.

2-[(3,3,5-Trimethylcyclohexyl)-$(CH_2)_n$]-1-naphthol wherein claims 4 to 12 inclusive is oxidized to 2-[3,3,5-trimethylcyclohexyl)-$(CH_2)_n$]-1,4-naphthoquinone by heating it at about 50°–80°C., preferably to about 60°–70C., with chromium trioxide, i.e., $CrO_3$, in a suitable solvent, e.g., acetic acid containing about 5 to 50 percent water. The reaction of 2-[(3,3,5-trimethylcyclohexyl)-$(CH_2)_n$]-1,4-naphthoquinone to form its 2,3-oxide is carried out by reacting the former compound with a peroxide, e.g., hydrogen peroxide under alkaline conditions, e.g., aqueous potassium or sodium hydroxide, preferably using a suitable organic solvent, e.g., tertiary-butanol, dioxane. The slightly exothermic reaction is run without any external heating. The 2,3-oxide is hydrolyzed under acidic conditions to produce 2-hydroxy-3-[(3,3,5-trimethylcyclohexyl)-$(CH_2)_n$]-1,4-naphthoquinone, the hydrolysis preferably being carried out by dissolving the oxide in concentrated sulfuric acid, adding this solution to a mixture of water (or ice) and acetic acid and then heating the reaction mixture on a steam bath.

The stepwise process of oxidizing 2-[(3,3,5-trimethylcyclohexyl)-$(CH_2)_n$]-1-naphthol to 2-[(3,3,5-trimethylcyclohexyl)-$(CH_2)_n$]-1,4-naphthoquinone is carried out by first reacting 2-[(3,3,5-trimethylcyclohexyl)-$(CH_2)_n$]-1-naphthol with a diazotized salt of sulfanilic acid to form 2-[(3,3,5-trimethylcyclohexyl)-$(CH_2)_n$]-4-sulfophenyldiazo)-1-naphthol. The diazo compound is reduced to the corresponding 4-amino compound, preferably using sodium hydrosulfite ($Na_2S_2O$) in aqueous methanol solution; the reduction also can be run using zinc and hydrochloric acid. The 4-amino compound in a suitable solvent, e.g., acetic acid, is oxidized to 2-[(3,3,5-trimethylcyclohexyl)-$(CH_2)_n$b-1,4-dihydro-4-imino-1-oxonaphthalene using chromium trioxide in aqueous acetic acid, preferably in the presence of sulfuric acid and then hydrolyzing the 4-imino sulfate salt in situ by heating the acidic reaction mixture at about 60° to 90°C. to yield 2-[(3,3,5-trimethylcyclohexyl)-$(CH_2)_n$]-1,4-naphthoquinone. Alternatively, by using no sulfuric acid during the oxidation, the 4-imino compound can be isolated as its chromate salt which is then hydrolyzed under acidic conditions, preferably by treating a hot aqueous acetic acid solution of the imino salt with a mineral acid, e.g., hydrochloric acid or sulfuric acid.

The best mode contemplated for carrying out the invention will now be set forth, as follows:

A. INTERMEDIATES 1. 3,3,5-Trimethylcyclohexanone—A 206 g. portion of isophorone (3,3,5-trimethyl-2-cyclohexenone) mixed with 500 ml. of ethyl acetate and 3 g. of platinum oxide was catalytically hydrogenated starting with an initial pressure of 500 p.s.i. of hydrogen at 27°C. and a final pressure of 75 p.s.i. hydrogen at 42°C. The reaction mixture was filtered; the filtrate concentrated to remove the solvent; and the residue distilled to yield 216.8 g. of 3,3,5-trimethylcyclo-hexanone. b.p. 189°–195°C.

2. Ethyl α-(3,3,5-trimethylcyclohexylidenyl)acetate—Diethyl carbethoxymethylphosphonate of the formula $(C_2H_5O)_2P(=O)CH_2COOC_2H_5$ was first prepared as follows: A mixture containing 405 g. of ethyl chloroacetate and 500 g. of triethyl phosphite was heated, with stirring, for 2 hours at 130°–140°C. allowing the ethyl chloride formed by the reaction to distill off. The reaction mixture was then distilled under reduced pressure to yield 572.6 g. of diethyl carbethoxymethylphosphonate, b.p. 95°–106°C. at 0.3 mm. To a suspension containing 111 g. of sodium hydride (50 percent suspension in mineral oil) in three liters of 1,2-dimethoxyethane was added 515 g. of diethyl carbethoxymethylphosphonate over a period of three hours with stirring. The mixture was stirred another fifteen minutes and to it was then added 323 g. of 3,3,5-trimethylcyclohexanone over a period of three hours while maintaining the temperature at about 34°–36°C. The reaction mixture was poured into five liters of cold water and the resulting mixture was extracted four times with ether. The combined extracts were dried over anhydrous magnesium sulfate and concentrated in vacuo on a steam bath to remove the ether and to yield 490 g. of ethyl α-(3,3,5-trimethylcyclohexylidenyl)-acetate. In another preparation this intermediate was found to distill at 104°–118°C. at 13 mm.

3. Ethyl α-(3,3,5-trimethylcyclohexyl)acetate—A solution of 205.2 g. of ethyl α-(3,3,5-trimethylcyclohexyl)-idenyl)acetate in 1,500 ml. of absolute ethanol was catalytically hydrogenated in the presence of platinium oxide using a starting pressure of 330 p.s.i. of hydrogen at room temperature. The reduction was completed in 4 hours. The reaction mixture was filtered; the filtrate concentrated in vacuo to remove the solvent; and, the remaining material distilled under reduced pressure to yield 104 g. of ethyl α-(3,3,5-trimethylcyclohexyl)acetate, b.p. 58°–60°C. at 0.01 mm.

4. α-(3,3,5-Trimethylcyclohexyl)acetic acid—A mixture containing 104 g. of ethyl α-(3,3,5-trimethy-cyclo-hexyl)acetate, 30 g. of potassium hydroxide, 250 ml. of methanol and 150 ml. of water was refluxed for 4 hours. To the reaction mixture was added 500 ml. of water, and the resulting mixture was acidified with aqueous hydrochloric acid. The acidic mixture was extracted with ether. The ether was dried over anhydrous magnesium sulfate and concentrated in vacuo to remove the ether. The remaining material was distilled under reduced pressure to yield 81.3 g. of α-(3,3,5-trimethylcyclohexyl)acetic acid, b.p. 71°–79°C. at 0.1 mm.

5. α-(3,3,5-Trimethylcyclohexyl)acetyl chloride—A solution containing 184.3 g. of α-(3,3,5-trimethylcyclohexyl)acetic acid in 300 ml. of chloroform was added to 178.5 g. of thionyl chloride at such a rate as to maintain a gently reflux. Refluxing was continued for one hour after addition of the acid. The reaction mixture was concentrated in vacuo and then distilled to yield 190 g. of α-(3,3,5-trimethylcyclohexyl)acetyl chloride b.p. 111°–114°C. at 14 mm.

6. 2-[α-(3,3,5-Trimethylcyclohexyl)acetyl]cyclohexanone—A solution of 190 g. of α-(3,3,5-trimethylcyclo-hexyl)acetyl chloride in 175 ml. of chloroform was added slowly to a solution of 159 g. of 1-morpholinocyclohexene, 104 g. of triethylamine and 550 ml. of chloroform over a period of 90 minutes, keeping the reaction temperature at 25°–30°C. The reaction was then kept in a refrigerator overnight. To the reaction mixture was added 125 ml. of concentrated hydro-chloric acid in 250 ml. of water; the resulting mixture was refluxed for 2 hours and then cooled. The layers were separated and the chloroform layer was washed successively with water (twice), 5 percent aqueous sodium bicarbonate solution and water; it was then dried over anhydrous magnesium sulfate, concentrated in vacuo to remove the chloroform and then distilled to yield 167 g. of 2-[α-(3,3,5-trimethylcyclohexyl)-acetyl]cyclohexanone, b.p. 122°–128°C. at 0.1 mm.

7. 7-Keto-8-(3,3,5-trimethylcyclohexyl)octanoic acid—A mixture containing 148.3 g. of 2-[α-(3,3,5-trimethylcyclohexyl)acetyl]72.4 g. of potassium hydroxide, 85% and 1.17 liters of water was refluxed for 45 minutes, with stirring until the mixture became homogeneous. The reaction mixture was cooled, acidified with concentrated hydrochloric acid and extracted with ether. The ether extract was dried over anhydrous magnesium sulfate, concentrated in vacuo to remove the ether and distilled to yield 139.0 g. of 7-keto-8-(3,3,5-trimethylcyclohexyl)octanoic acid, b.p. 150°–175°C. at 0.1 mm.

8. 8-(3,3,5-Trimethylcyclohexyl)octanoic acid—The mixture containing 138 g. of 7-keto-8-(3,3,5-trimethylcyclohexyl)octanoic acid, 95 ml. of 85 percent hydrazine hydrate and 800 ml. of diethylene glycol was heated for 2 hours and 45 minutes at 125°C., allowed to cool to about 110°C. and heated in vacuo to remove the excess hydrazine hydrate and water, bringing the temperature up to 125°C. again. To the reaction mixture was carefully added 134 g. of potassium hydroxide over a period of 2½ hours while gradually raising the temperature to 210°C. The reaction mixture was then poured onto two liters of ice and the mixture acidified with aqueous hydrochloric acid. The acidic mixture was extracted with ether. The ether extract was dried over anhydrous magnesium sulfate, concentrated in vacuo to remove the ether and distilled to yield 89.2 g. of 8-(3,3,5-trimethylcyclohexyl)octanoic acid, b.p. 155°–165°C. at 0.25 mm.

9. 8-(3,3,5-Trimethylcyclohexyl)octanoyl chloride—A solution containing 88.2 g. of 8-(3,3,5-trimethylcyclohexy)-octanoic acid and 100 ml. of chloroform was added over a period of one hour to 58.6 g. of thionyl chloride under reflux. The reaction mixture was refluxed for 2 more hours, concentrated in vacuo and distilled to yield 78.5 g. of 8-(3,3,5-trimethylcyclohexyl)octanoyl chloride, b.p. 139°–142°C. at 0.6-0.7 mm.

10. 8-(3,3,5-Trimethylcyclohexyl)octanol—A suspension of 13 g. of lithium aluminum hydride in 125 ml. of tetrahydrofuran was stirred until most of the hydride had dissolved. To this mixture was added over a period of 90 minutes a solution of 27.8 g. of 8-(3,3,5-trimethylcyclohexyl)-octanoic acid and 100 ml. of tetrahydrofuran. The reaction mixture was refluxed for 20 hours and then cooled in an ice-bath. To the reaction mixture was carefully added 5 ml. of 10 percent aqueous sodium hydroxide solution. The mixture was placed on a steam bath and to it was added slowly an additional 12 ml. of 10 percent aqueous sodium hydroxide solution. The mixture was refluxed for 10 minutes and then treated with an additional 20 g. of powdered potassium hydroxide and filtered, washing the filter-cake with tetrahydrofuran. The combined filtrate and washings were concentrated to remove the tetrahydrofuran, thereby yielding 21.7 g. of 8-(3,3,5-trimethylcyclohexyl)-octanol, which was essentially pure as indicated by its infrared spectrum.

11. 8-(3,3,5-Trimethylcyclohexyl)octyl bromide—A mixture containing 21.7 g. of 8-(3,3,5-trimethylcyclohexyl)-octanol, 50 g. of 48 percent hydrobromic acid and 7 ml. of concentrated sulfuric acid was refluxed for four hours, cooled and extracted with ether. The ether extract was washed with water, dried over anhydrous magnesium sulfate, concentrated in vacuo to remove the ether and distilled to yield 8-(3,3,5-trimethylcyclohexyl)octyl bromide, b.p. 115°–122°C. at 0.2 mm.

12. 10-(3,3,5-Trimethylcyclohexyl)decanoic acid—To 200 ml. of absolute ethanol was added 1.8 g. of sodium and the mixture was refluxed with stirring until a solution was obtained. To the solution was added 21.9 g. of diethyl malonate followed by 24.1 g. of 8-(3,3,5-trimethylcyclohexyl)-octyl bromide and the resulting mixture was for 20 hours. To the cooled reaction mixture was added a solution of 22 g. of potassium hydroxide in 23 ml. of water and the ethanol was distilled off, while adding water from time to time. The mixture was heated on a steam bath for 4 hours, cooled, poured onto ice and acidified with concentrated hydrochloric acid. The acidic mixture was extracted with ether. The ether extract was dried over anhydrous magnesium sulfate and heated in vacuo to remove the ether. The residue was heated with stirring to about 145° C. whereupon there was vigorous evolution of carbon dioxide. There thus remained 22 g. of 10-(3,3,5-trimethylcyclohexyl)decanoic acid.

13. 10-(3,3,5-Tetramethylcyclohexyl)decanoyl chloride—A solution of 22 g. of 10-(3,3,5-tetramethylcyclohexyl)-decanoic acid in 50 ml. of chloroform was added to 75 ml. of thionyl chloride over 30 minutes and the resulting solution was refluxed for 3 hours, concentrated in vacuo and distilled to yield 17.6 g. of 10-(3,3,5-tetramethylcyclohexyl)decanoyl chloride, b.p. 135°–152°C. at 0.25 mm.

14. 2-[8-(3,3,5-trimethylcyclohexyl)octanoyl]-cyclopentanone is prepared as in Example A-6 using corresponding molar equivalent quantities of 1-morpholinocyclopentene and 8-(3,3,5-trimethylcyclohexyl)octanoyl chloride in place of 1-morpholinocyclohexene and α-(3,3,5-trimethylcyclohexyl)acetyl chloride, respectively.

15. 6-Keto-13-(3,3,5-trimethylcyclohexyl)tridecanoic acid was prepared in Example A-7 using a corresponding molar equivalent quantity of 2[8-(3,3,5-trimethylcyclohexyl)octanoyl]-pentanone in place of 2-[α-(3,3,5-trimethylcyclohexyl)acetyl]-cyclohexanone.

16. 13-(3,3,5-Trimethylcyclohexyl)tridecanoic acid is prepared as in Example A-8 using a corresponding molar equivalent quantity of 6-keto-13-(3,3,5-trimethylcyclohexyl)-tridecanoic acid in place of 7-keto-8-(3,3,5-trimethylcyclohexyl)octanoic acid.

17. 13-(3,3,5-Trimethylcyclohexyl)tridecanoyl chloride is prepared as in Example A-9 using a corresponding molar equivalent quantity of 13-(trimethylcyclohexyl)tridecanoic acid in place of 8-(3,3,5-trimethylcyclohexyl)octanoic acid.

18. 2-(3,3,5-Trimethylcyclohexyl)ethanol is prepared as in Example A-10 using a corresponding molar equivalent quantity of α-(3,3,5-trimethylcyclohexyl)acetic acid in place of 8-(3,3,5-trimethylcyclohexyl)octanoic acid.

19. 2-(3,3,5-Trimethylcyclohexyl)ethyl bromide is prepared as in Example A-11 using a corresponding molar equivalent quantity of 2-(3,3,5-trimethylcyclohexyl)ethanol in place of 8-(3,3,5-trimethylcyclohexyl)octanol.

20. 4-(3,3,5-Trimethylcyclohexyl)butanoic acid is prepared as in Example A-12 using a corresponding molar equivalent quantity of 2-(3,3,5-trimethylcyclohexyl)ethyl bromide in place of 8-(3,3,5-trimethylcyclohexyl)octyl bromide.

21. 4-(3,3,5-Trimethylcyclohexyl)butanol is prepared as in Example A-10 using corresponding molar equivalent quantity of 4-(3,3,5-trimethylcyclohexyl)butanoic acid in place of 8-(3,3,5-trimethylcyclohexyl)octanoic acid.

22. 4-(3,3,5-Trimethylcyclohexyl)butyl bromide is prepared as in Example A-11 using a corresponding molar equivalent quantity of 4-(3,3,5-trimethylcyclohexyl)butanol in place of 8-(3,3,5-trimethylcyclohexyl)octanol.

23. 5-(3,3,5-Trimethylcyclohexyl)pentanoic acid—To a mixture containing 24.3 g. of magnesium in 500 ml. of ether is added 261.3 g. of 4-(3,3,5-trimethylcyclohexyl)butyl bromide at such a rate as to maintain a gentle reflux. The resulting solution is refluxed for thirty minutes and then cooled to room temperature. Next, 176 g. of crushed solid carbon dioxide is added as rapidly as foaming permits. The mixture is treated with aqueous hydrochloric acid and extracted with ether. The ether extract is dried over anhydrous magnesium sulfate and evaporated in vacuo to remove the ether, thereby yielding the 5-(3,3,5-trimethylcyclohexyl)pentanoic acid.

24. 4-(3,3,5-Trimethylcyclohexyl)butanol is prepared as in Example A-10 using a corresponding molar equivalent quantity of 4-(3,3,5-trimethylcyclohexyl)butanoic acid in place of 8-(3,3,5-trimethylcyclohexyl)octanoic acid.

25. 4-(3,3,5-Trimethylcyclohexyl)butyl bromide is prepared as in example A-11 using a corresponding molar equivalent quantity of 4-(3,3,5-trimethylcyclohexyl)butanol in place of 8-(3,3,5-trimethylcyclohexyl)octanol.

26. 6-(3,3,5-Trimethylcyclohexyl)hexanoic acid is prepared as in Example A-12 using a corresponding molar equivalent quantity of 4-(3,3,5-trimethylcyclohexyl)butyl bromide in place of 8-(3,3,5-trimethylcyclohexyl)octyl bromide.

27. 2-[α-(3,3,5-Trimethylcyclohexyl)acetyl]cyclopentanone is prepared as in Example A-6 using a corresponding molar equivalent quantity 1-morpholinocyclopentene in place of 1-morpholinocyclohexene.

28. 6-Keto-7-(3,3,5-trimethylcyclohexyl)heptanoic acid is prepared as in Example A-7 using a corresponding molar equivalent quantity of 2-[α(3,3,5-trimethylcyclohexyl)-acetyl]cyclopentanone in place of 2-[α-(3,3,5-trimethylcyclohexyl)acetyl]cyclohexanone.

29. 7-(3,3,5-Trimethylcyclohexyl)heptanoic acid is prepared as in Example A-8 using a corresponding molar equivalent of 6-keto-7-(3,3,5-trimethylcyclohexyl)heptanoic acid in place of 7-keto-8-(3,3,5-trimethylcyclohexyl)octanoic acid.

30. 2-[α-(3,3,5-Trimethylcyclohexyl)acetyl]-cycloheptanone is prepared as in Example A-6 using a corresponding molar equivalent quantity of 1-morpholinocycloheptene in place of 1-morpholinocyclohexene.

31. 8-Keto-9-(3,3,5-trimethylcyclohexyl)nonanoic acid is prepared in Example A-7 using a corresponding molar equivalent quantity of 2-[α-(3,3,5-trimethylcyclohexyl)acetyl]-cycloheptanone in place of 2-[α-(3,3,5-trimethylcyclohexyl)-acetyl]cyclohexanone.

32. 9-(3,3,5-Trimethylcyclohexyl)nonanoic acid is prepared as in Example A-8 using a corresponding molar equivalent quantity of 8-keto-9-(3,3,5-trimethylcyclohexyl)nonanoic acid in place of 7-keto-8-(3,3,5-trimethylcyclohexyl)octanoic acid.

33. 9-(3,3,5-Trimethylcyclohexyl)nonanol is prepared as in Example A-10 using a corresponding molar equivalent quantity of 9-(3,3,5-trimethylcyclohexyl)nonanoic acid in place of 8-(3,3,5-trimethylcyclohexyl)octanoic acid.

34. 9-(3,3,5-Trimethylcyclohexyl)nonyl bromide is prepared as in Example A-11 using a corresponding molar equivalent quantity of 9-(3,3,5-trimethylcyclohexyl)nonanol in place of 8-(3,3,5-trimethylcyclohexyl)octanol.

35. 11-(3,3,5-Trimethylcyclohexyl)undecanoic acid is prepared as in Example A-12 using a corresponding molar equivalent quantity of 9-(3,3,5-trimethylcyclohexyl)nonyl bromide in place of 8-(3,3,5-trimethylcyclohexyl)octyl bromide.

36. 10-(3,3,5-Trimethylcyclohexyl)decanol is prepared as in Example A-10 using a corresponding molar equivalent quantity of 10-(3,3,5-trimethylcyclohexyl)decanoic acid in place of 8-(3,3,5-trimethylcyclohexyl)octanoic acid.

37. 10-(3,3,5-Trimethylcyclohexyl)decyl bromide is obtained as in Example A-11 using a corresponding molar equivalent quantity of 10-(3,3,5-trimethylcyclohexyl)octanol.

38. 12-(3,3,5-Trimethylcyclohexyl)dodecanoic acid is obtained as in Example A-12 using a corresponding molar equivalent quantity of 10-(3,3,5-trimethylcyclohexyl)decyl bromide in place of 8-(3,3,5-trimethylcyclohexyl)octyl bromide.

39. 2-[7-(3,3,5-Trimethylcyclohexyl)heptanoyl]-1-naphthol—A solution of 50.4 g. of 7-(3,3,5-trimethylcyclohexyl)heptanoic acid and 29.3 g. of α-naphthol in 125 ml. of boron trifluoride etherate (47 percent) is stirred and heated on a steam bath for 1 hour. A total of 200 ml. of water was added carefully but fairly rapidly, while a vigorous evolution of ether ensued. The mixture is cooled and an additional 250 ml. of water is added. The product is extracted with chloroform. The extract is washed with water, dried over anhydrous calcium chloride while treated with decolorizing charcoal, and then concentrated in vacuo. The residue is slurried in 350 ml. of cold methanol and collected to yield 2-[7-(3,3,5-trimethylcyclohexyl)heptanoyl]-1-naphthol.

Following the above-described procedure of Example A-39 using a corresponding molar equivalent quantity of the appropriate ω-(3,3,5-trimethylcyclohexyl)alkanoic acid in place of 7-(3,3,5-trimethylcyclohexyl)heptanoic acid, the following corresponding [(3,3,5-trimethylcyclohexyl)alkanoyl] 1-naphthols are obtained: (2-[4-(3,3,5-trimethylcyclohexyl)-butanoyl]-1-naphthol, 2-[5-(3,3,5-trimethylcyclohexyl)pentanoyl]-1-naphthol, 2-[6-(3,3,5-trimethylcyclohexyl)hexanoyl]-1-naphthol, 2-[8-(3,3,5-trimethylcyclohexyl)octanoyl]-naphthol, 2-[9-(3,3,5-trimethylcyclohexyl)nonanoyl]-1-naphthol, 2-[10-(3,3,5-trimethylcyclohexyl)decanoyl]-1-naphthol, 2-[11-(3,3,5-trimethylcyclohexyl)undecanoyl [12-(3,3,5-trimethylcyclohexyl)dodecanoyl]-1-naphthol.

40. 2-[7-(3,3,5-Trimethylcyclohexyl)heptyl]-1-naphthol—A mixture of 26.2 g. of 2-[7-(3,3,5-trimethylcyclohexyl)heptanoyl]-1-naphthol, 100 g. of amalgamated zinc, 500 ml. of methanol and 100 ml. of concentrated hydrochloric acid is refluxed while stirring vigorously for 1 hour. An additional 100 ml. of concentrated hydrochloric acid is added and refluxing is continued for 2 hours. The volume is reduced to about 250 ml. in vacuo and then diluted with 200 ml. of water. The product is extracted with ether. The extract is dried over anhydrous calcium chloride and concentrated in vacuo to remove the ether. The remaining residue is crystallized from n-pentane by cooling in an acetone bath containing solid carbon dioxide to yield 2-[7-(3,3,5-trimethylcyclohexyl)heptyl]-1-naphthol.

Following the above-described procedure of Example A-40 using a molar equivalent quantity of the appropriate 2-[ω-(3,3,5-trimethylcyclohexyl)alkanoyl]-1 naphthol in place of 2-[7-(3,3,5-trimethylcyclohexyl)heptanoyl]-naphthol, the corresponding 2[ω-(3,3,5-trimethylcyclohexyl)alkyl]-1-naphthols are obtained: 2-[4-(3,3,5-trimethylcyclohexyl)butyl]-1-naphthol, 2-[5-(3,3,5-trimethylcyclohexyl)pentyl]-1-naphthol, 2-[6-(3,3,5-trimethylcyclohexyl)hexyl]-1-naphthol, 2-[8-(3,3,5-trimethylcyclohexyl)octyl]-1-naphthol, 2-[9-(3,3,5-trimethylcyclohexyl)nonyl]-1- naphthol, 2-[10-(3,3,5-trimethylcyclohexyl)decyl]-1-naphthol, 2-[11-(3,3,5-trimethylcyclohexyl)-undecyl]-1-naphthol and 2-[12-(3,3,5-trimethylcyclohexyl)-dodecyl]-1-naphthol.

B. FINAL PRODUCTS 1. 2-Hydroxy-3-[7-(3,3,5-trimethylcyclohexyl)-heptyl]-1,4-naphthoquinone—To a solution containing 77.5 g. of 8-(3,3,5-trimethylcyclohexyl)octanoyl chloride in 400 ml. of ether cooled to 0°C. was added over a period of 5 minutes 138 g. of 50 percent hydrogen peroxide and the mixture was allowed to stand for 5 minutes. To the resulting mixture kept at about 0°–2°C. was added over a period of 1 hour 25.5 g. of pyridine and the reaction mixture was stirred for one hour allowing it to warm up to room temperature. The ether layer was separated; washed successively with dilute aqueous hydrochloric acid, 5 percent aqueous sodium bicarbonate solution and water; dried over anhydrous calcium sulfate; and, concentrated to a volume of 250 ml. The ether solution containing bis[8-(3,3,5-trimethylcyclohexyl)octanoyl]peroxide was added to a solution of 28.2 g. of 2-hydroxy-1,4-naphthoquinone in 500 ml. of acetic acid over a period of 2 hours and 15 minutes while maintaining the temperature at about 98°–102C. After addition, the reaction mixture was heated at the same temperature for about 3 hours and then allowed to stand overnight. The reaction mixture was concen-trated in vacuo and the remaining material was treated with 400 ml. of ether. The mixture was filtered and the filtrate washed five times with 5 percent aqueous sodium bicarbonate solution, dried over anhydrous calcium sulfate and concentrated in vacuo to remove the ether. To the residue was added 500 ml. of absolute methanol, 2 ml. of concentrated sulfuric acid and the mixture was refluxed for two and one half hours and concentrated in vacuo to remove the solvent. The residue was dissolved in 300 ml. of n-pentane and the pentane solution shaken well with 400 ml. of 5 percent aqueous sodium hydroxide solution. The layers were separated and the precipitated sodium salt of the product was washed from the walls of the separatory funnel with 200 ml. of n-pentane and then was washed into the aqueous layer with methanol. The aqueous-methanol solution was acidified with concentrated hydrochloric acid and extracted with n-pentane. The pentane extract was dried over anhydrous magnesium sulfate and concentrated in vacuo to remove the n-pentane and then recrystallized twice from n-pentane to yield 10.1 g. of 2-hydroxy-3-[7-(3,3,5-trimethylcyclohexyl)heptyl]1,4-naphthoquinone, m.p. 85°–87 °C.

Other 2-hydroxy-3-[7-(3,3,5-trimethylcyclohexyl)alkyl]-1,4-naphthoquinones are prepared by following the procedure described in Example B–1 using a molar equivalent quantity described in Example B–1 using a molar equivalent quantity of the appropriate corresponding (3,3,5-trimethylcyclohexyl)-alkanoyl chloride in place of 8-(3,3,5-trimethylcyclohexyl-octanoyl chloride, as follows: 2-hydroxy-3-[4-(3,3,5-trimethylcyclohexyl)butyl]-1,4-naphthoquinone using 5-(3,3,5-trimethylcyclohexyl)pentanoyl chloride; 2-hydroxy-3-[5-(3,3,5-trimethylcyclohexyl)pentyl]1,4-naphthoquinone using 6-(3,3,5-trimethylcyclohexyl)hexanoyl chloride; 2-hydroxy-3-[6-(3,3,5-trimethylcyclohexyl)hexyl]-1,4-naphthoquinone using 7-(3,3,5-trimethylcyclohexyl)heptanoyl chloride; 2-hydroxy-3-[8-(3,3,5-trimethylcyclohexyl)octyl]-1,4-naphthoquinone using 9-(3,3,5-trimethylcyclohexyl)nonanoyl chloride; 2-hydroxy-3-[10-(3,3,5-trimethylcyclohexyl)decyl]-1,4-naphthoquinone using 11-(3,3,5-trimethylcyclohexyl)undecanoyl chloride; and, 2-hydroxy-3-[11-(3,3,5-trimethylcyclohexyl)undecyl]-1,4-naphthoquinone using 12-(3,3,5-trimethylcyclohexyl)dodecanoyl chloride.

2. 2-Hydroxy-3-[6-(3,3,5-trimethylcyclohexyl)hexyl]-1,4-naphthoquinone—A mixture containing 9.5 g. of 2-hydroxy 3[7-(3,3,5-trimethylcyclohexyl)heptyl]-1,4-naphthoquinone in 60 ml. of dioxane and 60 ml. of water containing 2.85 g. of sodium carbonate was heated with 4.75 ml. of 30 percent hydrogen peroxide under an atmosphere of nitrogen until the solution was colorless. The reaction mixture was cooled in an ice bath and treated with 4.8 ml. of concentrated hydrochloric acid and with 29 ml. of water saturated with sulfur dioxide. Nitrogen was then passed into the solution until the excess sulfur dioxide was eliminated. The remaining solution was treated with 48 ml. of 25 percent sodium hydroxide solution followed by 120 ml. of aqueous solution containing 24 g. of cupric sulfate pentahydrate. The mixture was heated on a steam bath for thirty minutes and filtered while hot. The precipitate was washed with dioxane and water until the filtrate came through clear. The combined filtrate and washings were acidified and extracted with ether. The ether extract was dried over anhydrous magnesium sulfate and concentrated in vacuo to remove the ether. The remaining residue was crystallized from methanol to yield 6.8 g. of 2-hydroxy-3-[6-(3,3,5-trimethylcyclohexyl)hexyl]-1,4-naphthoquinone, m.p. 69°–72 °C.

Other 2-hydroxy-3-[(3,3,5-trimethylcyclohexyl)alkyl]-1,4-naphthoquinones are prepared by following the procedure described in Example B–2 using a corresponding molar equivalent quantity of the corresponding higher adjacent homologous 2-hydroxy-3-[(3,3,5-trimethylcyclohexyl)alkyl]-1,4-naphthoquinone, as follows: 2-hydroxy-3-[9-(3,3,5-trimethylcyclohexyl)nonyl]-1,4-naphthoquinone using 2-hydroxy-3-[10-(3,3,5-trimethylcyclohexyl)decyl]-1,4-naphthoquinone; and, 2-hydroxy-3-[7-(3,3,5-trimethylcyclohexyl)heptyl]1,4-naphthoquinone using 2-hydroxy-3-[8-(3,3,5-trimethylcyclohexyl)octyl]-1,4-naphthoquinone.

3. 2-Hydroxy-3-[5-(3,3,5-trimethylcyclohexyl)pentyl]-1,4-naphthoquinone—A mixture containing 5.7 g. of 2-hydroxy-3-[6-(3,3,5-trimethylcyclohexyl)hexyl)-1,4-naphthoquinone in 40 ml. of water and 40 ml. of dioxane containing 1.73 g. of sodium carbonate was heated with 2.9 ml. of 30 percent hydrogen peroxide under nitrogen until the solution was colorless. The reaction mixture was cooled to 0°C. and treated with 2.9 ml. of concentrated hydrochloric acid and 18 ml. of water saturated with sulfur dioxide. Nitrogen was passed through the solution to remove the excess sulfur dioxide. Next was added 25 ml. of 25 percent aqueous sodium hydroxide solution followed by 72 ml. of aqueous solution containing 14.4 g. of cupric sulfate pentahydrate. The solution was heated for 30 minutes on a steam bath; filtered while hot; and the precipitate washed with dioxane and then water. The combined filtrate and washings were cooled, acidified with concentrated hydrochloric acid and extracted with ether. The ether extract was dried over magnesium sulfate, concentrated in vacuo to remove the ether, and the residue crystallized from methanol to yield 4.3 g. of 2-hydroxy-3-[5-(3,3,5-trimethylcyclohexyl)-pentyl]-1,4-naphthoquinone, m.p. 95°–97°C.

4. 2-Hydroxy-3-[4-(3,3,5-trimethylcyclohexyl)butyl]-1,4-naphthoquinone, m.p. 67°–69°C., 1.1 g, was obtained as in the procedure described above in example B-2 using, successively, 3.1 g. of 2-hydroxy-3-[5-(3,3,5-trimethylcyclohexyl)-pentyl]-1,4-naphthoquinone, 30 ml. of dioxane, 30 ml. of water, 0.98 g. of sodium carbonate and 1.65 ml. of hydrogen peroxide; 1.65 ml. of concentrated hydrochloric acid and 10 ml. of water saturated with sulfur dioxide; and, 16.5 ml. of aqueous 25 percent sodium hydroxide solution and 40 ml. of water containing 8.2 g. of cupric sulfate pentahydrate.

5. 2-Hydroxy-3-[9-(3,3,5-trimethylcyclohexyl)-nonyl]-1,4-naphthoquinone—To a solution containing 17.6 g. of 10-(3,3,5-trimethylcyclohexyl)decanoyl chloride dissolved in 100 ml. of absolute ether and cooled to 0°C. was added 30 g. of 50 percent hydrogen peroxide over a 5 minute period. The mixture was allowed to stand for 5 minutes and then do it was added 5.4 g. of pyridine over a 30 minute period while keeping the solution at 0°–2°C. The mixture was stirred while allowing it to warm up to room temperature. The ether layer was separated; washed successively with dilute aqueous hydrochloric acid, 5 percent aqueous sodium bicarbonate solution and water; dried over anhydrous calcium sulfate and, concentrated to a volume of about 75 ml. This solution was added dropwise to a solution of 6.0 g. of 2-hydroxy-1,4-naphthoquinone in 110 ml. of acetic acid keeping the solution at about 100°C. The mixture was stirred at 100°C. for an additional six hours and was concentrated in vacuo. The residue was treated with 150 ml. of ether, the mixture filtered and the precipitate filtered off. The filtrate was washed well with 5 percent aqueous sodium bicarbonate solution, dried over anhydrous magnesium sulfate and concentrated in vacuo to remove the ether. To the residue was added 100 ml. of methanol and 1.5 ml. of concentrated sulfuric acid, and the mixture refluxed for about two hours. The mixture was concentrated in vacuo to remove the solvent and the residue was taken up with n-pentane and the pentane solution was shaken well with 5 percent aqueous sodium hydroxide solution. The layers were separated and the precipitated sodium salt of the product was washed from the walls of the separatory funnel with n-pentane and then washed into the aqueous layer with methanol. The aqueous-methanol solution was acidified with concentrated hydrochloric acid and extracted with n-pentane. The pentane solution was treated with decolorizing charcoal, filtered, dried over anhydrous calcium sulfate and concentrated in vacuo to remove the n-pentane. The residue was crystallized from methanol and then recrystallized from methanol using decolorizing charcoal to yield 1.8 g. of 2-hydroxy-3-[9-(3,3,5-trimethylcyclohexyl)nonyl]-1,4-naphthoquinone, m.p. 56°–58C.

6. 2-Hydroxy-3-[8-(3,3,5-trimethylcyclohexyl)-octyl]-1,4-naphthoquinone is prepared following the procedure in Example B-2 using the corresponding molar equivalent quantities of 2-hydroxy-3-[9-(3,3,5-trimethylcyclohexyl)-nonyl] -1,4-naphthoquinone in place of 2-hydroxy-3-[7-(3,3,5-trimethylcyclohexyl)heptyl]-1,4-naphthoquinone.

7. 2-Hydroxy-3-[12-(3,3,5-trimethylcyclohexyl)-dodecyl]-1,4-naphthoquinone is prepared as in Example B-1 using a corresponding molar equivalent quantity of bis[13-(3,3,5-trimethylcyclohexyl)tridecanoyl] peroxide (from the corresponding acid chloride as in Example B-1) in place of bis[8-(3,3,5-trimethylcyclohexyl)octanoyl] peroxide.

8. 2-Hydroxy-3-[11-(3,3,5-trimethylcyclohexyl)-undecyl]-1,4-naphthoquinone is prepared as in Example B-2 using the corresponding molar equivalent quantity of 2-hydroxy-3-[12-(3,3,5-trimethylcyclohexyl)dodecyl]-1,4-naphthoquinone in place of 2-hydroxy-3-[7-(3,3,5-trimethylcyclohexyl)heptyl]-1,4-naphthoquinone.

9. 2-Hydroxy-3-[10-(3,3,5-trimethylcyclohexyl)-decyl]-1,4-naphthoquinone is prepared as in Example B-2 using a corresponding molar equivalent quantity of 2-hydroxy-3-11-(3,3,5-trimethylcyclohexyl)undecyl]-1,4-naphthoquinone in place of 2-hydroxy-3-[7-(3,3,5-trimethylcyclohexyl)heptyl]1,4-naphthoquinone.

10. 2-[7-(3,3,5-Trimethylcyclohexyl)heptyl]-1,4-naphthoquinone { by direct oxidation of 2-[7-(3,3,5-trimethy-cyclohexyl)-heptyl]-1-naphthol}—A solution of 8.0 g. of chromium trioxide in 8 ml. of acetic acid and 10 ml. of water is added dropwise with stirring over a period of 15 minutes to a solution of 7.3 g. of 2-[7-(3,3,5-trimethylcyclohexyl)heptyl]-1-naphthol in 50 ml. of acetic acid. The reaction is allowed to cool to room temperature (about 35°C.), stirred for seventeen hours and poured into 300 ml. of water. The mixture is cooled to 15°C. The resulting precipitate is collected and recrystallized from methanol to yield 2-[7-(3,3,5-trimethylcyclohexyl)heptyl]1,4-naphthoquinone.

Following the procedure described in Example B-10 using a corresponding molar equivalent quantity of the appropriate 2-[ω-(3,3,5-trimethylcyclohexyl)alkyl]-1-naphthol in place of 2-[7-(3,3,5-trimethylcyclohexyl)heptyl]-1-naphthol, the corresponding 2-[ω-(3,3,5-trimethylcyclohexyl)alkyl]-1,4-naphthoquinones are obtained: 2-[4-(3,3,5-trimethylcyclohexyl)-butyl]-1,4-naphthoquinone, 2-[5-(3,3,5-trimethylcyclohexyl)-pentyl]-1,4-naphthoquinone, 2-[6-(3,3,5-trimethylcyclohexyl)-hexyl]-1,4-naphthoquinone, 2-[8-(3,3,5-trimethylcyclohexyl)-octyl]-1,4-naphthoquinone, 2-[9-(3,3,5-trimethylcyclohexyl)-nonyl]-1,4-naphthoquinone, 2-[10-(3,3,5-trimethylcyclohexyl)-decyl]-1,4-naphthoquinone, 2-[11-(3,3,5-trimethylcyclohexyl)-undecyl]-1,4-naphthoquinone and 2-[12-(3,3,5-trimethylcyclo-hexyl)dodecyl]-1,4-naphthoquinone.

11. 2-[7-(3,3,5-Trimethylcyclohexyl)heptyl]-1,4-naphthoquinone-2,3-oxide—To a suspension of 8.8 g. of 2-[7-(3,3,5-trimethylcyclohexyl)heptyl]-1,4-naphthoquinone, 1.3 g. of potassium hydroxide in 20 ml. of water, and 100 ml. of tertiary-butanol is added 7.7 ml. of 30 percent hydrogen peroxide. The mixture is stirred at room temperature for 1 hour and then poured into 2 volumes of water. The precipitate is collected, washed well with water and dried at 30°C. in vacuo to yield 2-[7-(3,3,5-trimethylcyclohexyl)heptyl] -1,4-naphthoquinone-2,3-oxide.

Following the procedure described in Example B-11 using a corresponding molar equivalent quantity of the appropriate 2-[ω-(3,3,5-trimethylcyclohexyl)alkyl]-1,4-naphthoquinone in place of 2-[7-(3,3,5-trimethylcyclohexyl)heptyl]-1,4-naphthoquinone, there are obtained the following corresponding 2,3-oxides: 2-[4-(3,3,5-trimethylcyclohexyl)butyl]-1,4-naphthoquinone-2,3-oxide, 2-[5-(3,3,5-trimethylcyclohexyl)-pentyl]-1,4-naphthoquinone-2,3-oxide, 2-[6-(3,3,5-trimethyl-cyclohexyl)hexyl]-1,4-naphthoquinone-2,3-oxide, 2-[8-(3,3,5-trimethylcyclohexyl)octyl]-1,4-naphthoquinone-2,3-oxide, 2-[9-(3,3,5-trimethylcyclohexyl)nonyl]-1,4-naphthoquinone-2,3-oxide, 2-[10-(3,3,5-trimethylcyclohexyl)decyl]-1,4-naphthoquinone-2,3-oxide, 2-[11-(3,3,5-trimethylcyclohexyl)undecyl]-1,4-naphthoquinone-2,3-oxide and 2-[12-(3,3,5-trimethylcyclohexyl)dodecyl]-1,4-naphthoquinone-2,3-oxide.

12. 2-Hydroxy-3-[7-(3,3,5-trimethylcyclohexyl)-heptyl]1,4-naphthoquinone—A 32.4 g. portion of 2-[7-(3,3,5-trimethylcyclohexyl)heptyl]-1,4-naphthoquinone-2,3-oxide is added slowly to 150 ml. of concentrated sulfuric acid while maintaining the temperature at about 5°C. The mixture is allowed to warm to room temperature. After the solution becomes homogeneous, it is poured into a solution of 200 g. of ice in 600 ml. of glacial acetic acid. The mixture is heated on a steam bath for one hour and cooled. The resulting precipitate is collected and recrystallized from methanol using decolorizing charcoal to yield 2-hydroxy-3-[7-(3,3,5-trimethylcyclohexyl)heptyl]-1,4-naphthoquinone.

Following the procedure described above in Example B-12 using a corresponding molar equivalent quantity of the appropriate 2-[ω-(3,3,5-trimethylcyclohexyl)alkyl]-1,4-naphthoquinone-2,3-oxide in place of 2-[7-(3,3,5-trimethylcyclohexyl)heptyl]-1,4-naphthoquinone-2,3-oxide, there are obtained the following corresponding 2-hydroxy-3-[ω-(3,3,5-trimethylcyclohexyl)alkyl]-1,4-naphthoquinones: 2-hydroxy-3-[4-(3,3,5-trimethylcyclohexyl)butyl]-1,4-naphthoquinone, 2-hydroxy-3-[5-(3,3,5-trimethylcyclohexyl)pentyl]-1,4-naphthoquinone, 2-hydroxy-3-[6-(3,3,5-trimethylcyclohexyl)-hexyl]-1,4-naphthoquinone, 2-hydroxy-3-[8-(3,3,5-trimethylcyclohexyl)octyl]-1,4-naphthoquinone, 2-hydroxy-3-[9-(3,3,5-trimethylcyclohexyl)nonyl]-1,4-naphthoquinone, 2-hydroxy-3-[10-(3,3,5-trimethylcyclomethylhexyl)decyl]-1,4-naphthoquinone, 2-hydroxy-3-[11-(3,3,5-trimethylcyclohexyl)undecyl]-1,4-naphthoquinone and 2-hydroxy-3-[12-(3,3,5-trimethylcyclohexyl)dodecyl]-1,4-naphthoquinone.

13. 2-[7-(3,3,5-trimethylcyclohexyl)heptyl]-1,4-naphthoquinone [by stepwise oxidation via 4-amino-1-naphthol]-A mixture of 23.4 g. of sulfanilic acid and 7.2 g. of sodium carbonate in 135 ml. of water is heated until the materials are in solution. The solution is cooled to 15°C. and a cold solution of 10.2 g. of sodium nitrite in 27 ml. of water is added. The resulting solution is poured rapidly into a mixture of 30 ml. of concentrated hydrochloric acid and 160 g. of ice. The reaction mixture is allowed to stand in an ice bath for 20 minutes. In a 2-liter, 3-neck flask 49.5 g. of 2-[7-(3,3,5-trimethylcyclohexyl)heptyl]-1-naphthol in 270 ml. of methanol is treated with a solution of 30 g. of sodium hydroxide in 120 ml. of water and the slurry is cooled to 25°C. The suspension of the diazonium salt is then added, using 45 ml. of methanol to wash it in. The resulting purple solution containing 2-[7-(3,3,5-trimethylcyclohexyl)heptyl]4-(4-sulfophenyldiazo)-1-naphthol is stirred for 20 minutes. After heating the solution to 40°C. on a steam bath, a slurry of 67.2 g. of sodium hydrosulfite ($Na_2S_2O_4$) in 200 ml. of water is added cautiously and the temperature is raised to 80°C. The reaction mixture is stirred for 15 minutes without additional heating. The 4-amino-2-[7-(3,3,5-trimethylcyclo-hexyl)heptyl]-1-naphthol is collected and washed with water. To oxidized said 4-aminonaphthol, the moist precipitate is suspended in 350 ml. of acetic acid and the suspension is added fairly rapidly to a stirred solution of 30 g. of chromium trioxide in 300 ml. of acetic acid and 60 ml. of water, while maintaining the temperature at 60°C. After five minutes, the mixture is cooled and the precipitate collected. The 2-[7-(3,3,5-trimethylcyclohexyl)heptyl]-1,4-dihydro-4-imino-1-oxonaphthalene chromate salt is placed in a desiccator overnight. The imine salt is hydrolyzed by dissolving it in 250 ml. of hot acetic acid and adding 250 ml. of concentrated hydrochloric acid to the solution. After cooling, the mixture is poured into 500 ml. of water. The crystalline product that separates is collected and recrystallized from absolute ethanol to yield 2-[7-(3,3,5-trimethylcyclohexyl)heptyl]1,4-naphthoquinone.

A preferred modification of the above-described procedure is the oxidation of the 4-aminonaphthol as its sulfate salt, said modification being illustrated as follows: To a solution (cooled to 20°C.) containing 1.4 liters of water, 700 ml. of concentrated sulfuric acid, 4.1 liters of acetic acid and 415 g. of chromium trioxide is added, with external cooling, a slurry of 4-amino-2-[7-(3,3,5-trimethylcyclohexyl)-heptyl]-1-naphthol, obtained as above through the diazo compound from 688 g. of 2-[7-(3,3,5-trimethylcyclohexyl)heptyl]-1-naphthol, in 4 liters of acetic acid whereupon the temperature of the reaction mixture rises to about 45°C. The reaction mixture is then heated on a steam bath; after the temperature reaches about 87 C., 6 liters of water are added to the reaction mixture which is then cooled to 8°C. The resulting crystalling precipitate is collected, washed with a total of 6 liters of water, and dried at room temperature in vacuo to yield 2-[7-(3,3,5-trimethylcyclohexyl)heptyl]-1,4-naphthoquinone.

Following the above procedure of Example B-13 but using a corresponding molar equivalent quantity of the appropriate 2-[ω-(3,3,5-trimethylcyclohexyl)alkyl]-1-naphthol in place of 2-[7-(3,3,5-trimethylcyclohexyl)heptyl]-1-naphthol, there are obtained the following compounds: 2-[4-(3,3,5-trimethylcyclohexyl)butyl]-1,4-naphthoquinone, 2-[5-(3,3,5-trimethylcyclohexyl)pentyl]-1,4-naphthoquinone, 2-[6-(3,3,5-trimethylcyclohexyl)hexyl]-1,4-naphthoquinone, 2-[8-(3,3,5-trimethylcyclohexyl)octyl]-1,4-naphthoquinone, 2-[9-(3,3,5-trimethylcyclohexyl)nonyl]-1,4-naphthoquinone, 2-[10-(3,3,5-triemthylcyclohexyl)decyl]-1,4-naphthoquinone, 2-[11-(3,3,5-trimethylcyclohexyl)undecyl]-1,4-naphthoquinone and 2-[12-(3,3,5-trimethylcyclohexyl)dodecyl]1,4-naphthoquinone.

The antimalarial activity of the compounds of the invention was established by determining their efficacy against bloodlinduced *Plasmodium berghei* infections in Swiss mice. The NK-65 strain of *Plasmodium berghei* and female Swiss mice weighting 20 ± 2 grams were used in these determinations. The mice were infected intraperitoneally with a saline-diluted inoculum containing 5 × $^6$ parasitized red blood cells; the infected blood was obtained by intracardiac puncture of mice with a 5 to 7 day-old infection of *P. berghei*. Since many erythrocytes are invaded by more than one parasite, the average number of parasites injected into each mouse was approximately 1 × $10^7$. For each test, 10 mice were infected but untreated to serve as infection controls. The compound was weighed and homogeneously suspended in 10 percent gelatin so that each daily dose was prepared in a volume of 0.4 cc. The first day's dose was administered orally via stomach tube immediately after inoculation of the infected blood. For each of the next 3 days, the compound was administered in two equal doses (0.2 cc. each) at 8:00 a.m. and 4:00 p.m. On the fourth post-infection (p.i.) day, a drop of blood obtained from the tail vein of each surviving mouse was placed on a slide and a thin smear prepared, fixed and stained with Giemsa. The slides were examined under oil for parasites and parasitemia was recorded as the number of parasites per 10,000 erythrocytes. Many additional fields were inspected in smears where no parasites were found in 2,500 erythrocytes. Three groups of mice were tested at two-fold dosage levels. If mice were cleared of parasites on the forth day at the lowest level tested, the compound was retested for evaluation at lower dosages. On the basis of the number of mice cleared of parasites on the fourth p.i. day, the effective dose for 50 percent of the animals ($ED_{50}$) for each compound was calculated by the logarithmic-probit method of Miller and Tainter [Pro. Soc. Exper. Biol. & Med. 57, 261–264(1944)], thus providing for the compound its suppressive effect on blood-induced *P. berghei* infection in mice. When tested by the above-described procedure, the 2-hydroxy-3-[(3,3,5-trimethylcyclohexyl)alkyl]-1,4-naphthoquinones of the invention were found to have suppressive antimalarial activity, having $ED_{50}$ values in the range of about 5 to 20 mg./kg./day for 4 days.

The actual determination of the numerical biological data definitive for a particular compound is readily obtained according to the above standard test procedure by technicians versed in chemotherapeutical test procedures, without any need for any extensive experimentation.

In the above-described procedure he route of administration of the compound is oral, which is the preferred route; however, other routes of administration conventional for antimalarial chemotherapy can be used, e.g., subcutaneous, intravenous, intramuscular. The 2-hydroxy-3-[(3,3,5-trimethylcyclohexyl)alkyl]-1,4-naphthoquinones of the invention for oral use can be conveniently prepared either in dry form or in the form of a solution or suspension in a suitable liquid vehicle. In dry form said naphthoquinones can be incorporated with granulating and tableting agents, e.g., starch, calcium carbonate, talc, gelatin, acacia magnesium stearate, etc., and formulated in unit dosage form as tablets. Alternatively, they can be formulated in powder form either alone or in combination with one or more inert diluents, e.g., talc, starch, lactose, sucrose, etc., and, if desired, put into gelatin capsules. Formulations for parenteral use, when desired, can be readily prepared by incorporating in a suitable liquid vehicle one of said 2-hydroxy-3-[(3,3,5-trimethylcyclohexyl)-alkyl]-1,4-naphthoquinones. Formulations comprising a 2-hydroxy-3-[(3,3,5-trimethylcyclohexyl)alkyl]-1,4-naphtho-quinone of the invention can, if desired, be supplemented by the addition of one or more other antimalarial agents, for example, chloroquine, hydroxychloroquine, primaquine, pyrimethamine, chlorguanide, sulfametin, quinine, and the like.

We claim:

1. (3,3,5-Trimethylcyclohexyl)-$(CH_2)_x$—COOH where x is an integer from 3 to 12 inclusive.
2. 8-(3,3,5-Trimethylcyclohexyl)octanoic acid according to claim 1.
3. 10-(3,3,5-Trimethylcyclohexyl)decanoic acid according to claim 1.
4. 13-(3,3,5-Trimethylcyclohexyl)tridecanoic acid according to claim 1.
5. 4-(3,3,5-Trimethylcyclohexyl)butanoic acid according to claim 1.
6. 5-(3,3,5-Trimethylcyclohexyl)pentanoic acid according to claim 1.
7. 6-(3,3,5-Trimethylcyclohexyl)hexanoic acid according to claim 1.
8. 7-(3,3,5-Trimethylcyclohexyl)heptanoic acid according to claim 1.
9. 9-(3,3,5-Trimethylcyclohexyl)nonanoic acid according to claim 1.
10. 11-(3,3,5-Trimethylcyclohexyl)undecanoic acid according to claim 1.
11. 12-(3,3,5-Trimethylcyclohexyl)dodecanoic acid according to claim 1.

* * * * *